(12) United States Patent
Acuff (10) Patent No.: US 12,169,967 B1
(45) Date of Patent: *Dec. 17, 2024

(54) SYSTEM AND METHOD FOR CAPTURING BY A DEVICE AN IMAGE OF A LIGHT COLORED OBJECT ON A LIGHT COLORED BACKGROUND FOR UPLOADING TO A REMOTE SERVER

(71) Applicant: Charles Schwab & Co., Inc., Westlake, TX (US)

(72) Inventor: Amy L. Acuff, Austin, TX (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 18/149,303

(22) Filed: Jan. 3, 2023

Related U.S. Application Data

(63) Continuation of application No. 17/033,500, filed on Sep. 25, 2020, now Pat. No. 11,544,833, which is a continuation of application No. 15/994,956, filed on May 31, 2018, now Pat. No. 10,796,422.

(60) Provisional application No. 62/513,342, filed on May 31, 2017.

(51) Int. Cl.
| G06V 10/98 | (2022.01) |
| G06T 1/20 | (2006.01) |
| G06T 3/40 | (2006.01) |
| G06T 7/00 | (2017.01) |
| G06T 7/13 | (2017.01) |
| G06T 7/136 | (2017.01) |
| G06V 10/10 | (2022.01) |
| G06V 10/25 | (2022.01) |
| G06V 10/26 | (2022.01) |
| G06V 10/44 | (2022.01) |

(52) U.S. Cl.
CPC .............. *G06V 10/993* (2022.01); *G06T 1/20* (2013.01); *G06T 3/40* (2013.01); *G06T 7/0002* (2013.01); *G06T 7/13* (2017.01); *G06T 7/136* (2017.01); *G06V 10/17* (2022.01); *G06V 10/25* (2022.01); *G06V 10/267* (2022.01); *G06V 10/44* (2022.01); *G06T 2200/16* (2013.01); *G06T 2200/28* (2013.01); *G06T 2207/10024* (2013.01)

(58) Field of Classification Search
None
See application file for complete search history.

(56) References Cited

U.S. PATENT DOCUMENTS

| 9,208,550 | B2 * | 12/2015 | Chen ..................... G06V 30/40 |
| 10,796,422 | B1 * | 10/2020 | Acuff ....................... G06T 1/20 |
| 11,544,833 | B1 * | 1/2023 | Acuff ..................... G06T 7/136 |
| 2004/0012679 | A1 * | 1/2004 | Fan ........................ H04N 1/387 |
| | | | 348/207.99 |

(Continued)

*Primary Examiner* — Vikkram Bali
(74) *Attorney, Agent, or Firm* — Harness, Dickey & Pierce, P.L.C.

(57) ABSTRACT

A system and method allows a light colored image of an object such as a check to be detected and captured on a light colored background for uploading to a server for processing. Detection involves detecting edges of objects on the image, drawing a rectangle around the detected edges, testing for an aspect ratio of the rectangle within an approved range, testing for the rectangle being outside of a margin of the image and being a certain percentage of the image, and testing for blur within a tolerable range.

18 Claims, 3 Drawing Sheets

(56) References Cited

U.S. PATENT DOCUMENTS

| | | | |
|---|---|---|---|
| 2009/0175537 A1* | 7/2009 | Tribelhorn | G06T 7/194 |
| | | | 382/173 |
| 2010/0239166 A1* | 9/2010 | Zhang | G06V 30/1444 |
| | | | 382/176 |
| 2013/0124414 A1* | 5/2013 | Roach | G06Q 20/3276 |
| | | | 705/44 |
| 2014/0270329 A1* | 9/2014 | Rowley | G06Q 20/102 |
| | | | 382/100 |
| 2015/0112853 A1* | 4/2015 | Hegarty | G06Q 40/03 |
| | | | 705/38 |

* cited by examiner

SYSTEM AND METHOD FOR CAPTURING BY A DEVICE AN IMAGE OF A LIGHT COLORED OBJECT ON A LIGHT COLORED BACKGROUND FOR UPLOADING TO A REMOTE SERVER

RELATED APPLICATIONS

This application is a continuation of U.S. patent application Ser. No. 17/033,500 entitled, "System and Method For Capturing By A Device An Image Of A Light Colored Object on a Light Colored Background For Uploading To A Remote Server" filed by Amy Lyn Acuff on Sep. 25, 2020, U.S. patent application Ser. No. 15/994,956 entitled, "System and Method For Capturing By A Device An Image Of A Light Colored Object on a Light Colored Background For Uploading To A Remote Server" filed by Amy Lyn Acuff on May 31, 2018, which claims the benefit of U.S. Provisional patent application Ser. No. 62/513,342 entitled, "Method And Apparatus For Capturing By A Device An Image Of A Light Colored Object on a Light Colored Background For Uploading To A Remote Server" filed by Amy Lyn Acuff on May 31, 2017, each having the same assignee as the present application, and each is hereby incorporated by reference in its entirety.

FIELD OF THE INVENTION

The present invention is related to computer hardware and software and more specifically to computer hardware and software for image capture.

BACKGROUND OF THE INVENTION

Capturing an image of a light-colored object that is placed on a light colored background may not be possible using conventional techniques that include identifying the edges of the object. What is needed is a system and method that can capture an image of an object by a mobile device for uploading to a remote server over a network when the object and background are light colored.

SUMMARY OF INVENTION

A system and method identifies at a device that an image of a object available to be captured on that device is ready to be captured, without identifying the boundary of the object, allowing a light colored object to be placed on a light colored background for capture. The exact edges of the physical object need not be identified. Images are repeatedly captured and processed as described herein until the image is ready for uploading to a server for further processing.

The captured image is converted to a lower quality greyscale image from the native quality color image received from a camera of a device, and the image is filtered to reduce or remove noise. Locations of some or all edges of text, numbers, logos and other elements of the image are identified and a rectangle is defined that holds all of the identified edges. If the rectangle has an aspect ratio of an acceptable size, does not extend into any of the margins of the image, and occupies a sufficient percentage of the image, a higher quality image is captured and uploaded to a server for further processing, or the original one used to produce the lower quality one, is uploaded to a server for further processing.

DETAILED DESCRIPTION OF A PREFERRED EMBODIMENT

Figure 1:
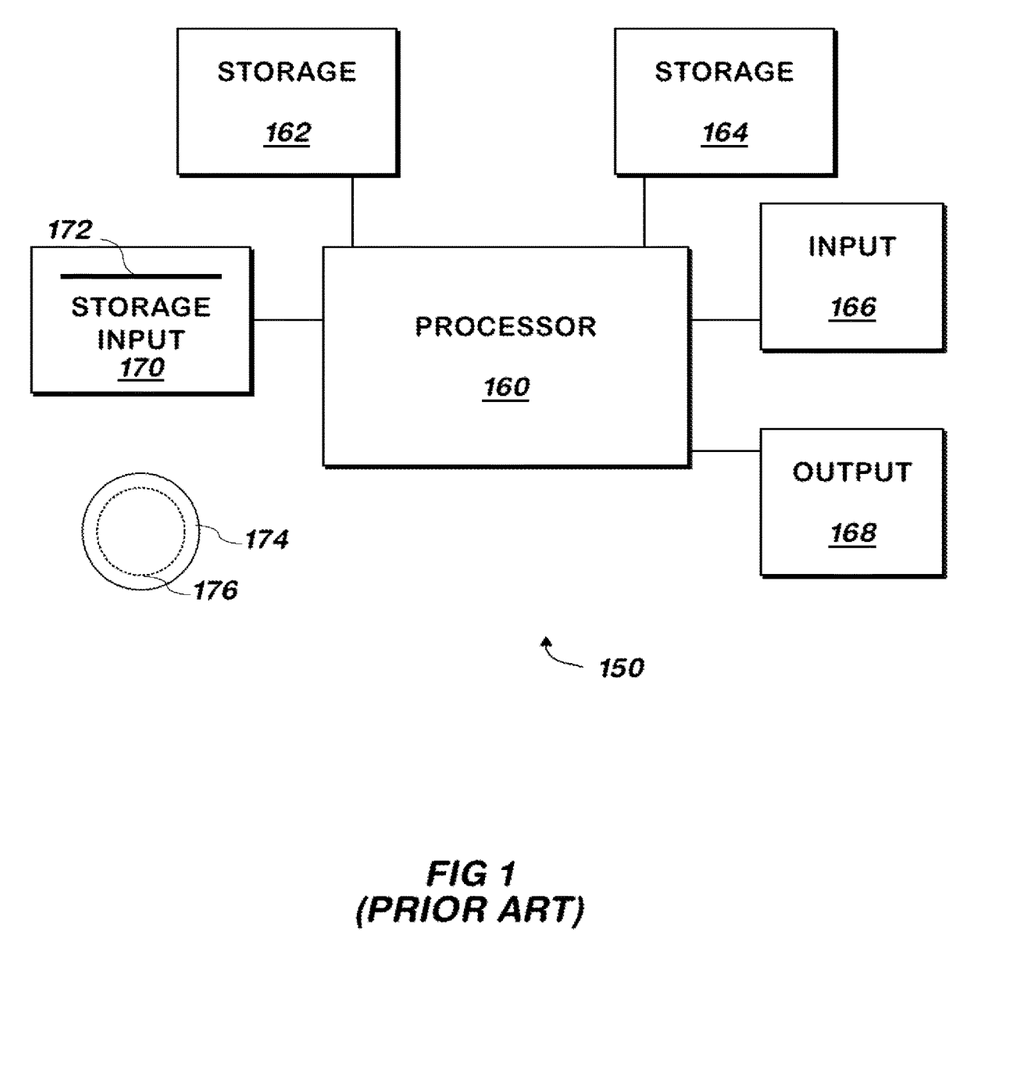
FIG. 1 is a block schematic diagram of a conventional computer system.

The present invention may be implemented as computer software running on a conventional computer system, computer software embodied on a non-transitory storage media, or otherwise. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of a system include any or all of at least one input, at least one output and at least one input/output. Other system elements may include a conventional processor.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the ORACLE SOLARIS 11 or higher operating system commercially available from ORACLE CORPORATION of Redwood Shores, California, a PENTIUM-compatible personal computer system such as are available from DELL COMPUTER CORPORATION of Round Rock, Texas running a version of the WINDOWS operating system (such as XP, VISTA, 7 or 8) commercially available from MICROSOFT Corporation of Redmond Washington or a Macintosh computer system running the OS X operating system commercially available from APPLE INCORPORATED of Cupertino, California and the FIREFOX browser commercially available from MOZILLA FOUNDATION of Mountain View, California or INTERNET EXPLORER browser commercially available from MICROSOFT above, although other systems may be used. Each computer system 150 may be a SAMSUNG GALAXY S5 commercially available from SAMSUNG ELECTRONICS GLOBAL of Seoul, South Korea running the ANDROID operating system commercially available from GOOGLE, INC. of Mountain View, California. Various computer systems may be employed, with the various computer systems communicating with one another via the Internet, a conventional cellular telephone network, an Ethernet network, or all of these.

Figure 2:
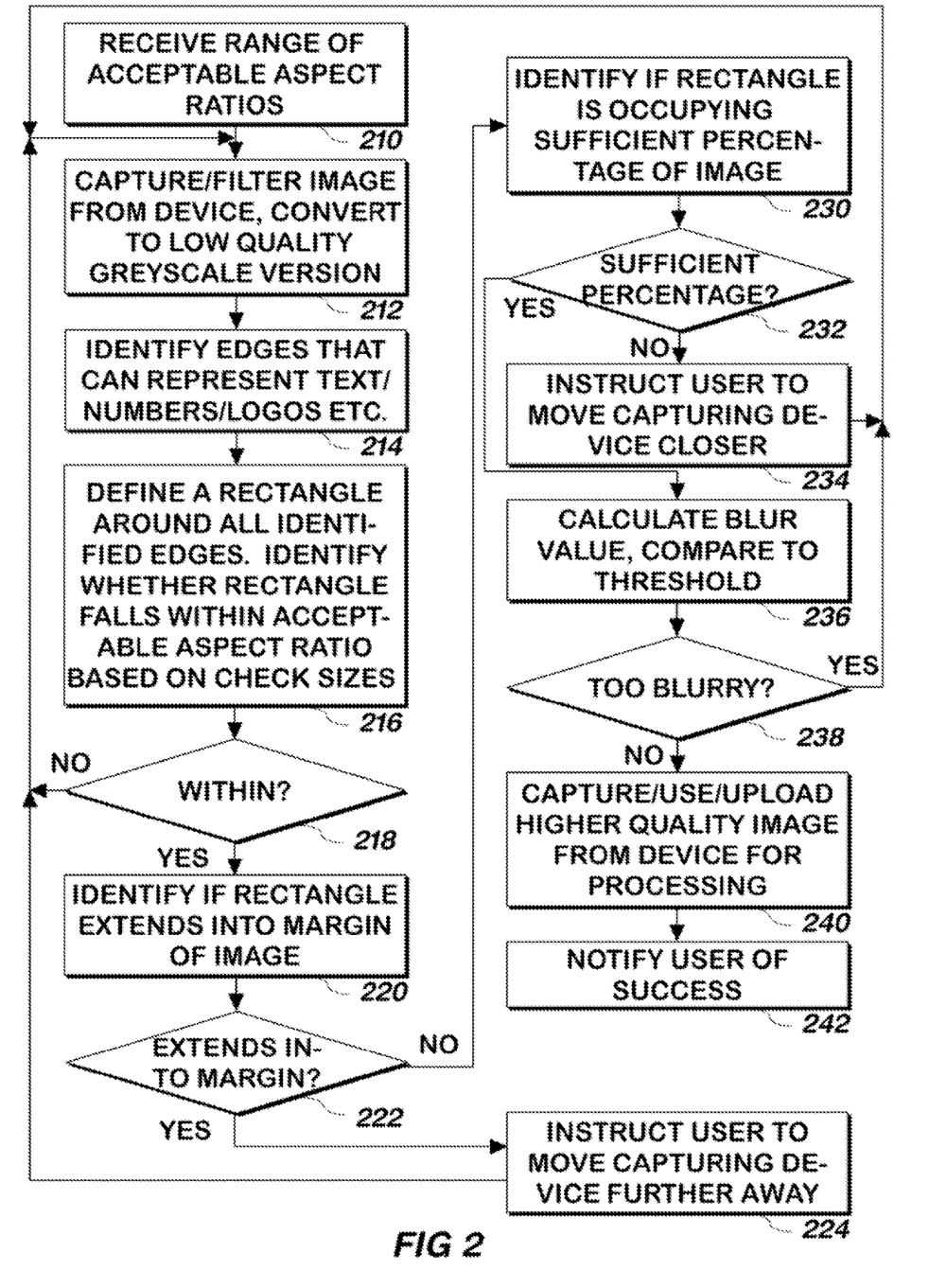
FIG. 2 is a flowchart illustrating a method of capturing an image of an object by a mobile device for uploading to a remote server over a network according to one embodiment of the present invention.

Referring now to FIG. 2, a method of capturing an image of an object by a mobile device for uploading to a remote server over a network is shown according to one embodiment of the present invention. The object may be a check, such as a paper check, or any other object.

A range of acceptable aspect ratios is received 210. The range of acceptable aspect ratios may be received by measuring a smallest and largest aspect ratio encountered using a sampling of similar objects previously received, and either using those measurements, or by taking the range and adding a small additional amount, such as 3%. Measurements may be made using the text or other writing on the objects, ignoring margins that do not have anything that would be identified as an edge of an element on the object.

At any time, a user may use a mobile device such as a smart phone or a tablet or other device that is remote from a server that will be used to process the object to allow images to be captured of the object 212. the object may be a light colored piece of paper with writing on it. The system and method repeatedly captures images and processes them as described herein until it is able to discern that the image most likely represents a complete image of the object, not excessively distant. As part of step 212, the image is filtered to remove noise using conventional techniques and the image is converted to a low quality greyscale representation, and such low quality representation is used from step 212 to step 234, unless step 212 is performed again in which case the prior image captured, filtered and converted is discarded. Step 212 may include discarding the original captured image.

Locations of edges are identified using conventional image recognition techniques 214. Edges are not the edges of the object, but are portions of text, numbers, or logos that would be printed or written on a typical object or objects that have been received in the past.

In one embodiment, the edges are identified by locating the outermost edges nearest to the corners of the image and the midpoint of the sides of the image. The edges outside of a boundary that would be made by drawing a line from each edge to the next nearest one are also located, but edges inside of the boundary are ignored.

A rectangle is defined using the locations of the edges identified, and a determination is made as to whether the rectangle has an aspect ratio within the range received in step 210. The rectangle is the smallest rectangle that holds the locations of the edges identified, and may or may not include an additional amount or percentage of the image. If the aspect ratio of the rectangle is not within the acceptable range of aspect ratios received in step 210 218, the method continues at step 212.

Otherwise 218, a determination is made as to whether the rectangle extends into any margin of the entire image 220. Each margin is an amount or percentage of space at each of the four edges of the image as converted. For example, the margin may be 3 percent of the width or height of the image, measured from the edge of the image to the other edge. Other percentages may be used or an absolute number of pixels may be used. For example, a 100×200 pixel converted image would have a margin of 3 pixels from either edge along the shorter dimension and 6 pixels from either edge among the longer dimension.

If the image extends into the margin 222, the user is instructed to move the device away from the object 224 and the method continues at step 212. Otherwise 222, a determination is made as to whether the rectangle occupies a sufficient percentage of the image, at least in one dimension 230. For example a 100×200 pixel converted image may have a threshold of the width of the rectangle occupying at least 85 percent of the longest dimension, 200 pixels, or a threshold of the height of the 85 percent of the shorter dimension, or a total area threshold of at least 65 percent of the total area of the image. If the threshold is not met 232, the user is instructed to move the capturing device closer to the object 234 and the method continues at step 212.

Otherwise 232, a blur value is calculated for the image and compared to a threshold 236. The blur value for the image may be calculated for some or all of the image. If some of the image is used, one or more portions of the image may be used to calculate a blur value for each portion, and the minimum blur value may be used or an average may be used. In one embodiment, to calculate the blur value or each blur value, a conventional Fast Fourier Transform may be used to convert the image in one dimension, or each of two dimensions, into a representation of the frequencies in such dimension or dimensions and the blur value is assigned to represent the relative values of the transform result at higher frequencies, excluding the highest frequencies in one embodiment, compared to the transform result of the lower frequencies (for example, the average value of such lower frequencies). A high blur value indicates the upper frequencies have, on average, a lower transform result than the lower frequencies.

In one embodiment, the variation of the Laplacian technique of Pech-Pecheco et al is used to compute the blur value, as set forth in Diatom Autofocusing in Beightfield Microscopy: a Comparative Study from the web site (after removing the spaces) optica. csic. es/papers/icpr2k.pdf, which is summarized at the web site (after removing the spaces) http://www.pyimagesearch.com/2015/09/07/blur-detection-with-opencv/.

Frequency thresholds to use and the threshold blur value may be identified by testing in focus images, out of focus images, and those that are minimally acceptable for the further processing of step 240.

If the blur value is on the side of the threshold indicating the image is too blurry 238, the method continues at step 212 to allow the autofocus feature of the device to better focus on the image. In one embodiment, the first iteration of step 212 turns on the autofocus feature of the device. In another embodiment, the device is instructed to refocus if the blur value is not above the threshold.

Otherwise 238, a higher quality image is captured or the most recent higher quality image used to produce the lower quality image is used, and uploaded via to a server via a network for processing 240. The image may be higher quality than the converted image or higher quality than the captured image of the most recent iteration of step 212. The higher quality image is then processed, for example, using recognition techniques, at the server. The user is then notified that the image was successfully captured 242, and the user may process another check or indicate that they are done. Any number of users may process any number of checks in any number of sessions as described herein.

System.

Figure 3:
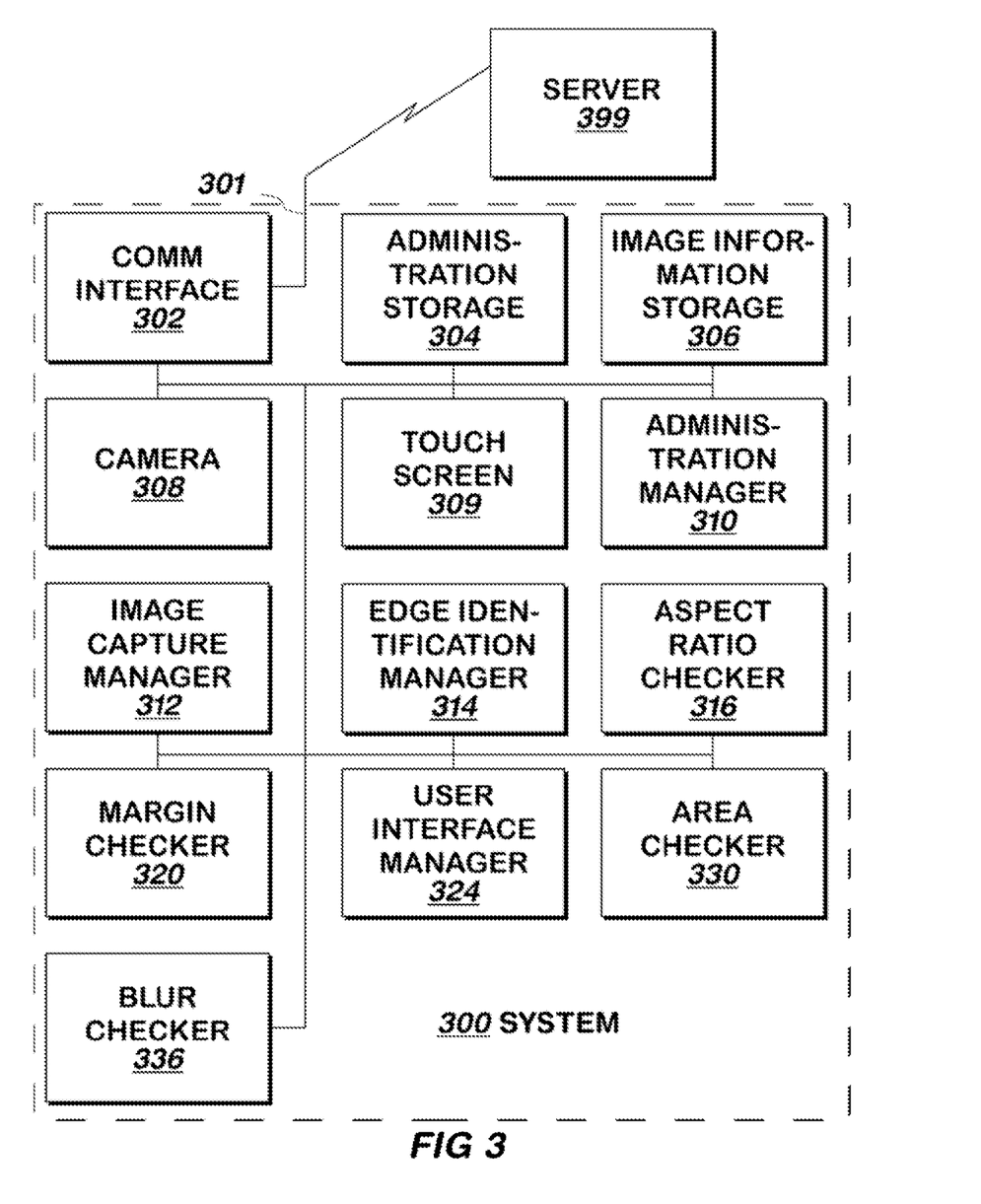
FIG. 3 is a block schematic diagram of a system for capturing an image of an object by a mobile device for uploading to a remote server over a network according to one embodiment of the present invention.

FIG. 3 illustrates a system 300 for capturing an image of an object by a mobile device for uploading to a remote server over a network according to one embodiment of the present invention. Referring now to FIG. 3, a system for capturing an image of an object by a mobile device for uploading to a remote server over a network is shown according to one embodiment of the present invention. System 300 includes communication interface 302 that includes a conventional TCP/IP-compatible communication interface running suitable communication protocols such as TCP/IP, Ethernet, and cellular radio protocols, and is coupled to a network such as an Ethernet network, mobile network, and the networks that make up the Internet, via input/output 301. Unless otherwise noted, all communication with system 300 is made via input/output 301 of communication interface 302. Image capture is a notable exception, being performed by camera 308, in one embodiment.

Administration manager 310 receives the acceptable aspect ratios or one or more ranges of acceptable aspect ratios as described above and stores them into administration storage 304. All storage elements 304, 306 of system 300 may include conventional disk or memory storage. Administration manager 310 may receive such information via communication interface 302, such information may be included as part of administration manager 310 as supplied, or both. In one embodiment, elements of system 300 numbered 310 or above are downloaded in part, as part of an app. Each such element includes a hardware computer processor, which may include the computer processor of the device onto which the app is downloaded.

When the user is ready to take a picture of a check or other object for uploading to a server over a network, the user uses a user interface element displayed on the touch screen 309 of the user device by user interface manager 324. In response, user interface manager 324 signals image capture manager 312.

When signaled, image capture manager 312 enables camera 308 of the user's device on which the app is installed, captures and filters an image as described above, converts it to a low quality greyscale version as described above and stores it into image information storage 306. Image capture manager 312 may also store in image information storage the original image or an image closer in resolution to the original image that may also be optionally filtered and converted or otherwise processed or preprocessed. Image capture manager 312 provides an image object referencing the low quality grayscale version to edge identification manager 314 and retains an object referencing the higher quality version, if such a version is also stored as described above.

When it receives the image object, edge identification manager 314 identifies edges that can represent text, numbers, logos and the like as described above, stores the locations of such edges into the object, identifies and stores into the image object the coordinates of a rectangle containing the edges, as described above, and provides the image object to aspect ratio checker 316.

When it receives the image object, aspect ratio checker 316 identifies the aspect ratio of the rectangle as described above, determines whether it corresponds to one of the acceptable aspect ratios or is within, or within a tolerance amount of the range of acceptable aspect ratios, or within any of the acceptable aspect ratios, stored in administration storage 304, and if so, provides the image object to margin checker 320. Otherwise, it signals image capture manager 312, which repeats the process described above, overwriting the image or images with one or more new images in image information storage 306.

When it receives the image object, margin checker 320 determines whether the rectangle in the image object extends into the margin of the image. The margin may be a fixed width in either or both dimensions or it may be a function of the image (e.g. a certain percent of each dimension) or a function of the size of the largest edge or space between edges (e.g. twice or three times the size of the longest edge detected or twice the longest space between edges near the edge of the image, in which case edge identification manager 314 adds the margin sizes into the image object it provides). If the rectangle does not extend into the margin, margin checker 320 provides the image object to area checker 330. Otherwise, it signals image capture manager 312, which repeats the process described above, overwriting the image or images with one or more new images in image information storage 306.

When it receives the image object, area checker 330 checks the rectangle to determine whether it is occupying a sufficient percentage of the image as described above. A sufficient area may be 80, 85, 90 or 95 percent of the image in at least one dimension or 60, 65, 70, 75, 80, 85, or 90 percent of the image in two dimensions. A sufficient percentage may be identified by determining minimum percentages from which successful recognition is obtained on the server when the image is uploaded, and then taking the minimum or a value close to the minimum that allows a margin of safety to account for differences in equipment. If the rectangle occupies a sufficient percentage of the image, area checker 330 provides the image object to blur checker 336. Otherwise, it signals image capture manager 312, which repeats the process described above, overwriting the image or images with one or more new images in image information storage 306.

When it receives the image object, blur checker 336 uses the image to calculate a blur value as described above. The blur value may be calculated on the image, or an area around each of the edges and then the blur values are averaged or weighted averaged (with the weights corresponding to the size of the areas) or the minimum or maximum is selected, to compute a blur value for the image. If the area around the edges is used, the areas are identified by edge identification manager 314 (for example by providing the coordinates of the upper left corner and lower right corner of each of the edges) and stored into the image object by edge identification manager 314, which blur checker 336 uses to identify the blur values that it averages, weighted averages or uses to select the minimum or maximum.

Blur checker 336 then compares the blur value for the image with a threshold it internally stores. The threshold is selected by identifying the image with the maximum amount of blur that can be reliably recognized via optical character recognition that will later be used to process the check or other object.

If the comparison indicates that the amount of blur is below an acceptable level of blur, blur checker 336 provides the image object to image capture manager 312. Otherwise, it signals image capture manager 312, which repeats the process described above, overwriting the image or images with one or more new images in image information storage 306.

When the various elements signal image capture manager 312 due to the image not being acceptable as described above, they may also signal user interface manager 324 with a unique indication identifier, which user interface manager 324 uses to display an error message and/or suggestion on the touch screen 309 of the user device.

When it receives the image object, image capture manager 312 uploads the higher quality image stored in image storage 306 (or takes another image of higher quality and uploads the other image) to server 399, for further processing and signals user interface manager 324, which informs the user that the check or other object was captured successfully. In one embodiment, further processing includes optical character recognition of the check and clearing of the check, for example, via an automated clearing house.

CERTAIN EMBODIMENTS OF THE PRESENT INVENTION

Described is a method of determining whether an image should be uploaded from a mobile device to a server, including:
receiving a range of acceptable ratios of height and width;
capturing the image on the mobile device;
creating a lower resolution version of the image captured;
identifying edges of two or more items in the lower resolution version of the image that could represent at least one edge of at least one selected from a set including characters, numbers and logos;
identifying a smallest rectangular boundary that surrounds all of the edges identified;
determining whether a height and width of the rectangular boundary is within the range of acceptable ratios of height and width;
responsive to the height and width of the rectangular boundary being within the range of acceptable ratios of height and width, determining whether the rectangular boundary falls within a margin inside at least one edge of the lower resolution version of the image;
responsive to the rectangular boundary not falling within the margin inside at least one edge of the lower resolution version of the image, uploading to the server from the mobile device, the image or another image other than the lower resolution version of the image.

The method may include an optional feature whereby the range of acceptable ratios corresponds to printed information of at least one check.

The method may additionally include, responsive to the rectangular boundary falling within the margin inside at least one edge of the lower resolution version of the image, instructing a user of the mobile device to move the mobile device further away from a subject of the image.

The method:
may additionally include determining whether an area of the rectangular boundary encloses at least a threshold percentage of the lower resolution version of the image or the image; and
may include an optional feature whereby the uploading is additionally responsive to the area of the rectangular boundary enclosing at least the threshold percentage of the lower resolution version of the image or the image.

The method may additionally include, responsive to the area of the rectangular boundary not enclosing at least the threshold percentage of the lower resolution version of the image or the image, instructing a user of the mobile device to move the mobile device closer to a subject of the image.

The method:
may additionally include:
calculating a blur value based on a level of blur of the lower resolution version of the image or the image; and
comparing the blur value to a threshold; and
may include an optional feature whereby the uploading is additionally responsive to blur value and the threshold.

Described is a system for determining whether an image should be uploaded from a mobile device to a server, including:
an administration manager having an input for receiving a range of acceptable ratios of height and width, the administration manager for providing at an output the range of acceptable ratios;
an image capture manager having an input/output coupled to a camera on the mobile device, the image capture manager for capturing the image using the camera, creating a lower resolution version of the image captured, and providing at an output the lower resolution version of the image;
an edge identification manager having an input coupled to the image capture manager output for receiving the lower resolution version of the image, the edge identification manager for identifying edges of two or more items in the lower resolution version of the image that could represent at least one edge of at least one selected from a set including characters, numbers and logos and for providing at an output locations of the edges of the two or more items;
an aspect ratio checker having an input coupled to the edge identification manager output for receiving the locations of the edges of the two or more items, and to the administration manager output for receiving the range of acceptable ratios, the aspect ratio checker for identifying a smallest rectangular boundary that surrounds all of the edges identified, and determining whether a height and width of the rectangular boundary is within the range of acceptable ratios, and responsive to the height and width of the rectangular boundary being within the range of acceptable ratios of height and width, providing at an output information about a location of the rectangular boundary; and
a margin checker having an input coupled to the aspect ratio checker output for receiving the information about the location of the rectangular boundary, the margin checker for determining whether the rectangular boundary falls within a margin inside at least one edge of the lower resolution version of the image, and responsive to the rectangular boundary not falling within the margin inside at least one edge of the lower resolution version of the image, signaling at an output;
and wherein the image capture manager input is coupled to the margin checker output for receiving the signal, and the image capture manager is additionally for uploading from the mobile device to the server, the image or another image other than the lower resolution version of the image responsive to the signal.

The system may include an optional feature whereby the range of acceptable ratios corresponds to printed information of at least one check.

The system:
may include an optional feature whereby the margin checker is additionally for, responsive to the rectangular boundary falling within the margin inside at least one edge of the lower resolution version of the image providing at the margin checker output a notification; and
may additionally include a user interface manager having an input coupled to the margin checker output for receiving the notification, the user interface for, responsive to the notification, providing via an output instructions to a user of the mobile device to move the mobile device further away from a subject of the image.

The system:
may include an optional feature whereby the aspect ratio checker is additionally for providing at the aspect ratio checker output information about an area of the rectangular boundary responsive to the height and width of the rectangular boundary being within the range of acceptable ratios of height and width;
may additionally include an area manager having an input coupled to the aspect ratio checker output for receiving the information about the area of the rectangular boundary, and to the margin checker output for receiving the signal, the area manager for determining whether the area of the rectangular boundary encloses at least a threshold percentage of the lower resolution version of the image or the image, and for providing at an output coupled to the image capture manager the signal, responsive to the area of the rectangular boundary enclosing at least the threshold percentage of the lower resolution version of the image or the image.

The system:
may include an optional feature whereby the area manager is additionally for, responsive to the area of the rectangular boundary not enclosing at least the threshold percentage of the lower resolution version of the image or the image, providing at the area manager output a notification; and
may additionally include a user interface manager having an input coupled to the area manager output for receiving the notification, the user interface manager for, responsive to the notification, instructing a user of the mobile device to move the mobile device closer to a subject of the image.

The system:
may additionally include a blur checker having an input coupled to the image capture manager output for receiving the lower resolution version of the image, the blur checker for calculating a blur value based on a level of blur of the lower resolution version of the image, and comparing the blur value to a threshold and for providing at an output a blur signal responsive to blur value and the threshold; and
may include an optional feature whereby the image capture manager input is additionally coupled to the blur checker output for receiving the blur signal, and the image capture manager uploads from the mobile device to the server, the image or another image other than the lower resolution version of the image additionally responsive to the blur signal.

Described is a computer program product including a non-transitory computer useable medium having computer readable program code embodied therein for determining whether an image should be uploaded from a mobile device to a server, the computer program product including computer readable program code devices configured to cause a computer system to:
receive a range of acceptable ratios of height and width;
capture the image on the mobile device;
create a lower resolution version of the image captured;
identify edges of two or more items in the lower resolution version of the image that could represent at least one edge of at least one selected from a set including characters, numbers and logos;
identify a smallest rectangular boundary that surrounds all of the edges identified;
determine whether a height and width of the rectangular boundary is within the range of acceptable ratios of height and width;
responsive to the height and width of the rectangular boundary being within the range of acceptable ratios of height and width, determine whether the rectangular boundary falls within a margin inside at least one edge of the lower resolution version of the image;
responsive to the rectangular boundary not falling within the margin inside at least one edge of the lower resolution version of the image, upload to the server from the mobile device, the image or another image other than the lower resolution version of the image.

The computer program product may include an optional feature whereby the range of acceptable ratios corresponds to printed information of at least one check.

The computer program product may additionally include computer readable program code devices configured to cause the computer system to, responsive to the rectangular boundary falling within the margin inside at least one edge of the lower resolution version of the image, instruct a user of the mobile device to move the mobile device further away from a subject of the image.

The computer program product:
may additionally include computer readable program code devices configured to cause the computer system to determine whether an area of the rectangular boundary encloses at least a threshold percentage of the lower resolution version of the image or the image; and
may include an optional feature whereby the computer readable program code devices configured to cause the computer system to upload are additionally responsive to the area of the rectangular boundary enclosing at least the threshold percentage of the lower resolution version of the image or the image.

The computer program product, may additionally include computer readable program code devices configured to cause the computer system to, responsive to the area of the rectangular boundary not enclosing at least the threshold percentage of the lower resolution version of the image or the image, instructing a user of the mobile device to move the mobile device closer to a subject of the image.

The computer program product:
may additionally include computer readable program code devices configured to cause the computer system to:
calculate a blur value based on a level of blur of the lower resolution version of the image or the image; and
compare the blur value to a threshold; and
may include an optional feature whereby the computer readable program code devices configured to cause the computer system to upload are additionally responsive to blur value and the threshold.

Each system element may include a conventional hardware processor or hardware processor system or processor system or processor that is coupled to a hardware memory or hardware memory system or memory or memory system, each of these being conventional in nature. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa.

What is claimed is:

1. A method of determining whether an image should be uploaded from a mobile device to a server, the method comprising:
   receiving at least one range of acceptable ratios of height and width;
   capturing the image on the mobile device;
   identifying edges of a plurality of items in the image or at least one different version of the image, each of said edges potentially representing at least one edge of at least one selected from a set comprising characters, numbers and logos;
   identifying a rectangular boundary that surrounds all of the edges identified, the rectangular boundary comprising a boundary height and a boundary width;
   determining whether a ratio of the boundary height and the boundary width is within at least one of the at least one range of acceptable ratios of height and width;
   determining whether the rectangular boundary falls within a margin inside at least one edge of at least one of the at least one different version of the image or the image; and
   responsive to the rectangular boundary not falling within the margin inside the at least one edge of the at least one of the at least one different version of the image or the image and to the ratio of the boundary height and the boundary width of the rectangular boundary being within at least one of the at least one range of acceptable ratios of height and width, uploading to the server from the mobile device, the image, at least one of the at least one different version of the image, or an other version of the image.

2. The method of claim 1, wherein at least one of the at least one range of acceptable ratios of height and width corresponds to printed information of at least one check.

3. The method of claim 1, additionally comprising, responsive to the rectangular boundary falling within the margin inside the at least one edge of the at least one of the at least one different version of the image or the image, instructing a user of the mobile device to move the mobile device further away from a subject of the image.

4. The method of claim 1, additionally comprising:
   determining whether an area of the rectangular boundary encloses at least a threshold percentage of at least one of the at least one different version of the image or the image,
   wherein the uploading is additionally responsive to the area of the rectangular boundary enclosing at least the threshold percentage of the at least one of the at least one different version of the image or the image.

5. The method of claim 4, additionally comprising, responsive to the area of the rectangular boundary not enclosing at least the threshold percentage of at least one of the at least one different version of the image or the image:
   instructing a user of the mobile device to move the mobile device closer to a subject of the image.

6. The method of claim 1, additionally comprising:
   calculating a blur value based on a level of blur of at least one of the at least one different version of the image or the image; and
   comparing the blur value to a threshold,
   wherein the uploading is additionally responsive to the comparing the blur value to the threshold.

7. A system for determining whether an image should be uploaded from a mobile device to a server, comprising:
   an administration manager having an administrator manager input for receiving at least one range of acceptable ratios of height and width, the administration manager for providing at an administrator manager output the at least one range of acceptable ratios of height and width;
   an image capture manager having an image capture manager input and an image capture manager output coupled to a camera on the mobile device, the image capture manager for capturing the image using the camera and providing at the image capture manager output the image or at least one different version of the image;
   an edge identification manager having an edge identification manager input coupled to the image capture manager output for receiving the image and/or the at least one different version of the image, the edge identification manager for identifying edges of a plurality of items in at least one of the at least one different version of the image or the image and for providing, at an edge identification manager output, locations of the edges of the plurality of items;
   an aspect ratio checker having an aspect ratio checker input coupled to the edge identification manager output for receiving the locations of the edges of the plurality of items, and to the administration manager output for receiving the at least one range of acceptable ratios of height and width, the aspect ratio checker for identifying a rectangular boundary that surrounds all of the edges having the locations received at the aspect ratio checker input, the rectangular boundary comprising a boundary height and a boundary width, and for determining whether a ratio of the boundary height and the boundary width is within at least one of the at least one range of acceptable ratios of height and width, and responsive to the ratio of the boundary height and the boundary width being within at least one of the at least one range of acceptable ratios of height and width, providing, at an aspect ratio checker output, information about a location of the rectangular boundary; and
   a margin checker having a margin checker input coupled to the aspect ratio checker output for receiving the information about the location of the rectangular boundary, the margin checker for determining whether the rectangular boundary falls within a margin inside at least one edge of at least one of the at least one different version of the image or the image, and responsive to the rectangular boundary not falling within the margin inside at least one edge of at least one of the at least one different version of the image or the image, providing a signal at a margin checker output,
   wherein the image capture manager input is additionally coupled to the margin checker output for receiving the signal, and the image capture manager is additionally for uploading from the mobile device to the server, the image, at least one of the at least one different version of the image, or an other version of the image, responsive to the signal.

8. The system of claim 7, wherein at least one of the at least one range of acceptable ratios of height and width corresponds to printed information of at least one check.

9. The system of claim 7, wherein
   the margin checker is additionally for, responsive to the rectangular boundary falling within the margin inside the at least one edge of the image or at least one of the at least one different version of the image, providing at the margin checker output a notification; and the system further comprises a user interface manager having a user interface manager input coupled to the margin checker output for receiving the notification, the user interface manager for, responsive to the notification, providing via a user interface manager output, instructions to a user of the mobile device to move the mobile device further away from a subject of the image.

10. The system of claim 7, wherein the aspect ratio checker is additionally for providing, at the aspect ratio checker output, information about an area of the rectangular boundary responsive to the boundary height and the boundary width being within at least one of the at least one range of acceptable ratios of height and width; and the system further comprises an area manager having an area manager input coupled to the aspect ratio checker output for receiving the information about the area of the rectangular boundary, and to the margin checker output for receiving the signal, the area manager for determining whether the area of the rectangular boundary encloses at least a threshold percentage of at least one of the at least one different version of the image or the image, and for providing, at an area manager output coupled to the image capture manager, the signal, responsive to the area of the rectangular boundary enclosing at least the threshold percentage of at least one of the at least one different version of the image or the image.

11. The system of claim 10, wherein the area manager is additionally for, responsive to the area of the rectangular boundary not enclosing at least the threshold percentage of at least one of the at least one different version of the image or the image, providing at the area manager output a notification; and the system further comprises a user interface manager having a user interface manager input coupled to the area manager output for receiving the notification, the user interface manager for, responsive to the notification, instructing via a user interface manager output a user of the mobile device to move the mobile device closer to a subject of the image.

12. The system of claim 7, additionally comprising:

a blur checker having a blur checker input coupled to the image capture manager output for receiving at least one of the at least one different version of the image or the image, the blur checker for calculating a blur value based on a level of blur of the image or at least one of the at least one different version of the image, comparing the blur value to a threshold, and for providing at a blur checker output a blur signal responsive to the comparing the blur value to the threshold, and wherein the image capture manager input is additionally coupled to the blur checker output for receiving the blur signal, and the image capture manager uploads from the mobile device to the server, the image, at least one of the at least one different version of the image or the other version of the image, additionally responsive to the blur signal.

13. A non-transitory computer useable medium having computer readable program code embodied therein for determining whether an image should be uploaded from a mobile device to a server, the computer readable program code configured to cause a computer system to:

receive at least one range of acceptable ratios of height and width;

capture the image on the mobile device;

identify edges of a plurality of items in the image or at least one different version of the image;

identify a rectangular boundary that surrounds all of the edges identified, the rectangular boundary comprising a boundary height and a boundary width;

determine whether a ratio of the boundary height and the boundary width is within at least one of the at least one range of acceptable ratios of height and width;

determine whether the rectangular boundary falls within a margin inside at least one edge of the image or at least one of the at least one different version of the image; and responsive to the rectangular boundary not falling within the margin inside the at least one edge of the image or at least one of the at least one different version of the image and to the ratio of the boundary height and the boundary width of the rectangular boundary being within at least one of the at least one range of acceptable ratios of height and width, upload to the server from the mobile device, the image, at least one of the at least one different version of image or an other version of the image.

14. The non-transitory computer readable medium of claim 13, wherein at least one of the at least one range of acceptable ratios of height and width corresponds to printed information of at least one check.

15. The non-transitory computer readable medium of claim 13, additionally comprising computer readable program code configured to cause the computer system to, responsive to the rectangular boundary falling within the margin inside the at least one edge of the image or at least one of the at least one different version of the image, instruct a user of the mobile device to move the mobile device further away from a subject of the image.

16. The non-transitory computer readable medium of claim 13, additionally comprising computer readable program code configured to cause the computer system to determine whether an area of the rectangular boundary encloses at least a threshold percentage of at least one of the at least one different version of the image or the image; and wherein the computer readable program code configured to cause the computer system to upload are additionally responsive to the area of the rectangular boundary enclosing at least the threshold percentage of the image or at least one of the at least one different version of the image.

17. The non-transitory computer readable medium of claim 16, additionally comprising computer readable program code devices configured to cause the computer system to, responsive to the area of the rectangular boundary not enclosing at least the threshold percentage of the image or at least one of the at least one different version of the image or the image, instructing a user of the mobile device to move the mobile device closer to a subject of the image.

18. The non-transitory computer readable medium of claim 13: additionally comprising computer readable program code configured to cause the computer system to:

calculate a blur value based on a level of blur of at least one of the at least one different version of the image or the image; and compare the blur value to a threshold, wherein the computer readable program code configured to cause the computer system to upload are additionally responsive to the computer readable program code configured to cause the computer system to compare the blur value to the threshold.

* * * * *